(12) United States Patent
Igawa

(10) Patent No.: US 6,173,988 B1
(45) Date of Patent: Jan. 16, 2001

(54) AIRBAG DEVICE

(75) Inventor: Tadahiro Igawa, Tokyo (JP)

(73) Assignee: Takata Corporation, Tokyo (JP)

( * ) Notice: Under 35 U.S.C. 154(b), the term of this patent shall be extended for 0 days.

(21) Appl. No.: 09/301,610

(22) Filed: Apr. 29, 1999

(30) Foreign Application Priority Data

May 18, 1998 (JP) .................................................. 10-135330

(51) Int. Cl.$^7$ .................................................. B60R 21/16
(52) U.S. Cl. ........................................ 280/728.2; 280/732
(58) Field of Search ............................ 280/728.2, 731, 280/732, 740, 741, 728.1

(56) References Cited

U.S. PATENT DOCUMENTS

| | | | |
|---|---|---|---|
| 3,907,330 | * 9/1975 | Kondo et al. | 280/731 |
| 3,945,665 | * 3/1976 | Tsutsumi et al. | 280/731 |
| 5,176,400 | * 1/1993 | McGuire et al. | 280/731 |
| 5,346,248 | * 9/1994 | Rhein et al. | 280/728.1 |
| 5,511,818 | * 4/1996 | Jarboe et al. | 280/728.2 |
| 5,556,127 | * 9/1996 | Hurford et al. | 280/730.2 |

FOREIGN PATENT DOCUMENTS 6-72266 3/1994 (JP) .
6-72272 3/1994 (JP) .

* cited by examiner

*Primary Examiner*—Paul N. Dickson
(74) *Attorney, Agent, or Firm*—Kanesaka & Takeuchi

(57) ABSTRACT

An airbag device is provided which allows the required strength of a container to be reduced, thus lightening the weight of the container. A holding plate 18 is inserted into an airbag 20 through an opening 24 of the airbag 20. A flange 18b of the holding plate 18 is superposed on a peripheral portion of the opening 24 and stud bolts 22 are inserted through bolt-through holes formed in the peripheral portion of the airbag 20. The stud bolts 22 are further inserted through bolt-through holes 26 formed in the bottom of a container 10. After an inflator 16 is fitted into a housing portion 18a of the holding plate 18 through an opening 12 of the container 10, a mounting bracket 14 is superposed on the bottom of the container 10 and the stud bolts 22 are inserted through bolt-through holes of the mounting bracket 14. Then, nuts 30 are screwed up-onto the bolts 22. After the airbag 20 is folded and accommodated in the container 10, a lid 32 is put on the container 10.

7 Claims, 3 Drawing Sheets

AIRBAG DEVICE

BACKGROUND OF THE INVENTION AND RELATED ART STATEMENT

The present invention relates to an airbag device for protecting an occupant which is installed in a vehicle and, more particularly, to an airbag device preferably used for a passenger's seat. In detail, the present invention relates to an airbag device which has an improved structure for fixing an airbag and an inflator to reduce the required strength of a container, thereby lightening the container.

As well known in the art, an airbag device is designed for protecting an occupant by inflating an airbag with gas from an inflator. In case of an airbag device for a front passenger's seat, the airbag is folded and accommodated in a container.

Japanese patent publications 6-72272A and 6-72266A disclose an airbag device for a passenger which has a container of synthetic resin to reduce weight of the device.

In the passenger airbag device as described in these publications, since the airbag is connected to the inlet side of the container, the container is required to have high strength as a whole. When the airbag is inflated, large tensile force is exerted to the container from the airbag, so that the container is required to have enough strength for withstanding this tensile force. A mesh member is inserted in the synthetic resin to reinforce thereof whereby increasing weight of the container.

OBJECT AND SUMMARY OF THE INVENTION

An object of the present invention is to provide an airbag device which allows a container to have lower strength and lower weight than conventional containers.

An airbag device of the present invention comprises a container having bottom and side walls; an airbag disposed inside the container; a lid covering the container; and an inflator which spouts gas for inflating the airbag. The airbag has an opening formed in a portion confronting the bottom of the container. A holding plate for mounting the inflator and the airbag to the container is disposed inside the airbag. A mounting bracket for securing the airbag device to a structural member of a vehicle is disposed on an outer surface of the bottom of the container. A peripheral portion of the opening of the airbag and the container are clamped between the holding plate and the mounting bracket.

The bottom of the container and the peripheral portion of the opening of the airbag are clamped between the mounting bracket and the holding plate, whereby the airbag can be securely connected to the mounting bracket even when the container itself has lower strength. When the mounting bracket and the holding plates are made of high-strength material including metal (e.g. steel), the airbag can be securely held when inflated even though the container is made of light material such as a relatively thin steel plate or synthetic resin.

The inflator is supported by the holding plate, thereby eliminating a special member for mounting the inflator.

In one aspect of the present invention, the container is provided with an opening formed in the bottom thereof and the mounting bracket and the inflator are in contact with each other through the opening of the container and the opening of the airbag.

In another aspect of the present invention, the bottom of the container lies between the inflator and the mounting bracket.

The holding plate may comprise a housing portion covering the inflator and a flange portion projecting from the entire periphery of the housing portion and being superposed on a peripheral portion of the opening of the airbag, and the housing portion may be provided with gas holes for allowing gas spouted from the inflator to pass therethrough.

The flange portion may have stud bolts fixed thereto, end portions of the stud bolts protrude outside through the airbag and the container, and nuts are screwed onto the end portions of the stud bolts outside the container, whereby the holding plate, the peripheral portion of the opening of the airbag, the inflator, the container, and the mounting bracket are integrated together. The container may be made of synthetic resin and the holding plate and the mounting bracket may be made of metal.

BRIEF DESCRIPTION OF THE DRAWINGS

FIG. 1b is a sectional view taken along a line Ib—Ib of FIG. 1a;

DETAILED DESCRIPTION OF PREFERRED EMBODIMENTS

Figure 1A:
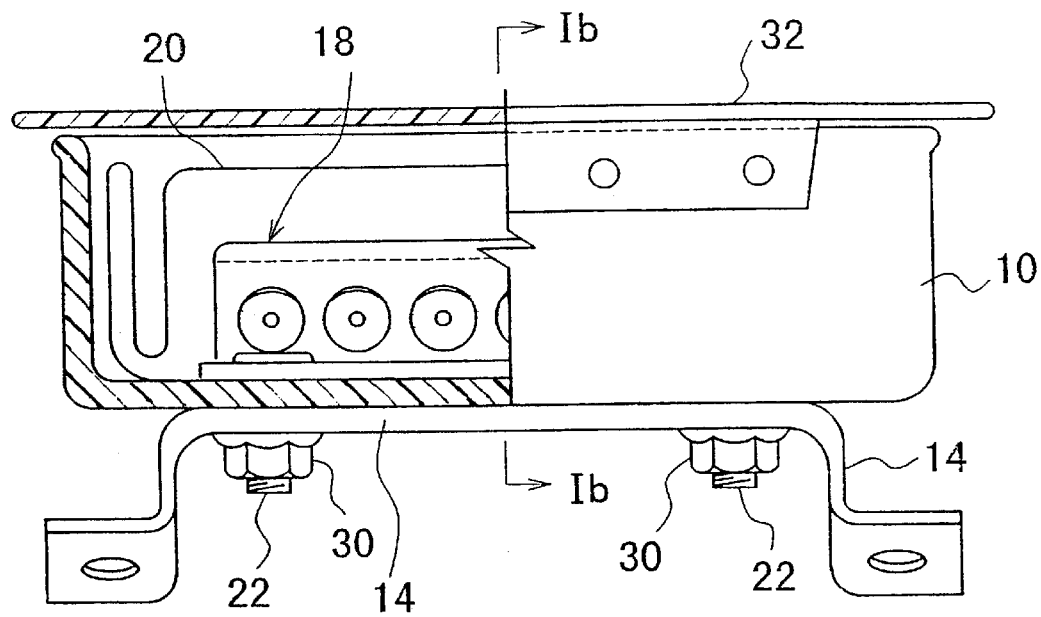
FIG. 1a is a front view of an airbag device according to an embodiment, of which the left-hand side shows a section taken along a line Ia—Ia in FIG. 1b.

Hereinafter, preferred embodiments of the present invention will be described with reference to the attached drawings. A container 10 is a vessel-like member having a bottom and four side walls, further having an opening 12 formed in the bottom. Disposed beneath the bottom is a mounting bracket 14. Disposed above the bottom are an inflator 16, a holding plate 18, and an airbag 20. The holding plate 18 has an $\Omega$-like section and comprises a housing portion 18a in which the inflator 16 is accommodated and a flange portion 18b projecting from the entire periphery of the housing portion 18a. The housing portion 18a is provided with gas holes 18c for allowing gas spouted out from the inflator 16 to pass therethrough. Stud bolts 22 are fixed to the flange portion 18b by welding or the like.

The airbag 20 has an opening 24 which has substantially the same configuration and the same size as the opening 12. The holding plate 18 is inserted into the airbag 20 through the opening 24. The flange portion 18b is superposed on the peripheral portion of the opening 24 and the stud bolts 22 are inserted through bolt-through holes formed in the peripheral portion of the opening 24. The stud bolts 22 are further inserted into bolt-through holes 26 formed in the bottom of the container 10.

After the inflator 16 is fitted into the housing portion 18a through the opening 12, the mounting bracket 14 is superposed on the bottom of the container 10. In this state, the stud bolts 22 are inserted through bolt-through holes 28 of the mounting bracket 14 and then nuts 30 are screwed onto the stud bolts 22. As a result of this, the holding plate 18, the airbag 20, the inflator 16, the container 10, and the mounting bracket 14 are all connected integrally.

After that, the airbag 20 is folded and accommodated inside the container 10 and then a lid 32 is put on the container 10 and is fixed to the container 10 by, for example, rivets 34.

The airbag device is secured to a vehicle by fixing the mounting bracket 14 to a structural member transversely extending inside an instrument panel of the vehicle. When the inflator 16 is actuated because of a vehicle collision, the airbag 20 is inflated and the lid 34 opens like doors toward a windshield so that the airbag 20 can be largely inflated into a compartment.

Since the peripheral portion of the opening 24 of the airbag 20 is clamped between the holding plate 18 and the mounting bracket 14, impact during the inflation of the airbag 20 is transferred to the structural member of the vehicle through the holding plate 18, the mounting bracket 14, the bolts 22, and the nuts 30. No tensile force from the airbag 20 is exerted onto the container 10. This allows the container 10 to be made of synthetic resin which has lower strength as compared to steel, but has lighter weight. This also eliminates the requirement of a mesh member for reinforcing the synthetic resin.

The opening 12 is formed in the container 10 so that the inflator 16 is in contact with the mounting bracket 14, not in contact with the container 10. Therefore, as for the heat generated during the actuation of the inflator 16, heat is not substantially transferred to the container 10. As a result of this, a synthetic resin having poor heat resistance can be employed as the synthetic resin for the container 10.

Figure 1B:
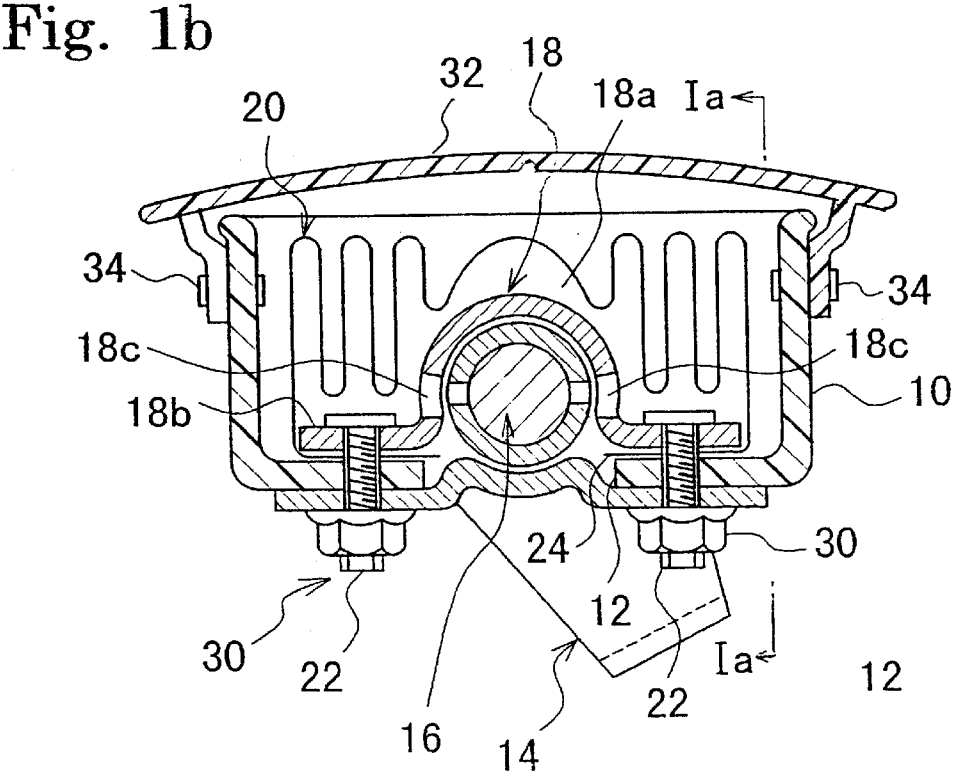
Figure 2:
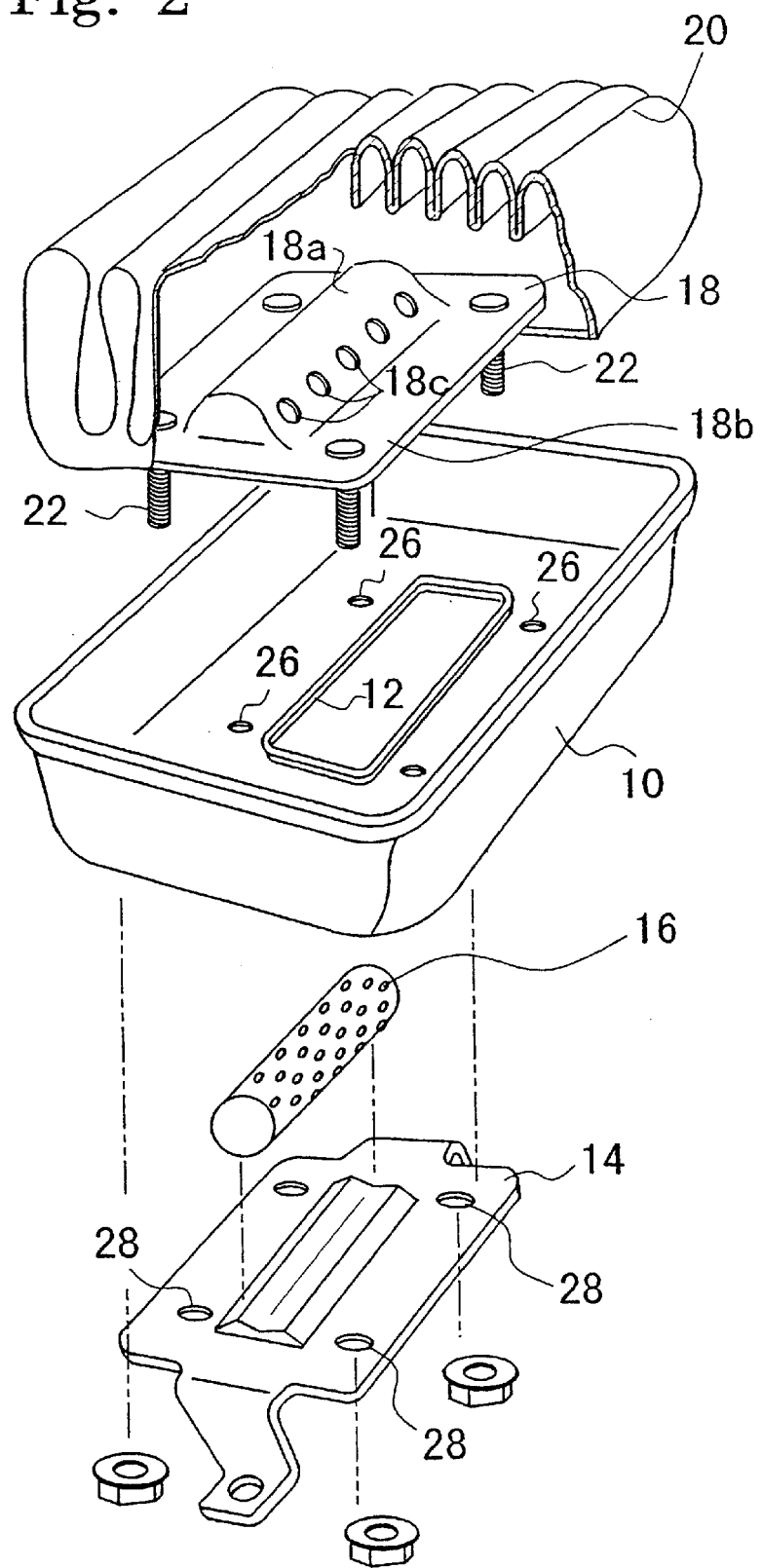
FIG. 2 is an exploded perspective view of the airbag device.
Figure 3:
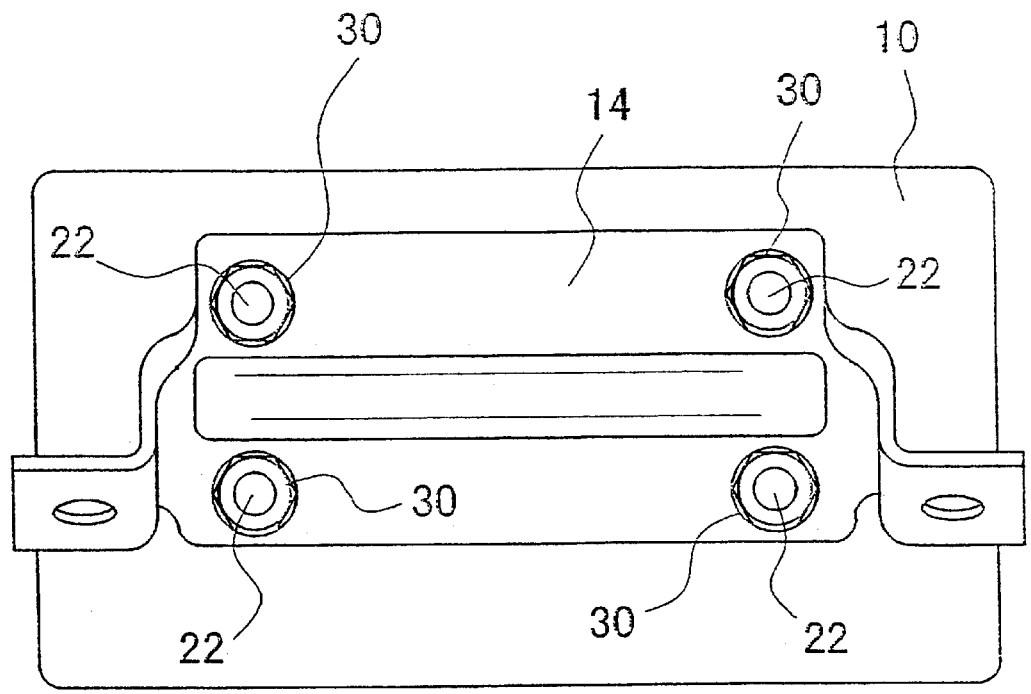
FIG. 3 is a bottom view of the airbag device.
Figure 4:
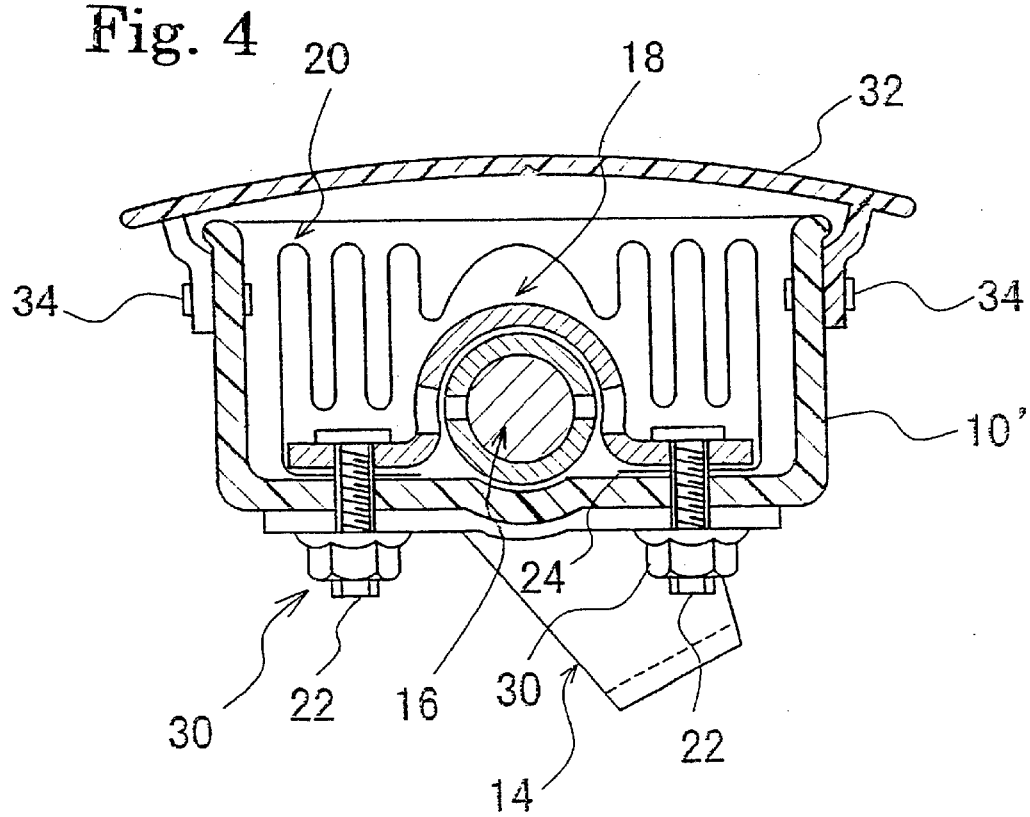
FIG. 4 is a sectional view of an airbag device according to another embodiment.

According to the present invention, a container 10' without the opening 12 may be employed as shown in FIG. 4. The other structures of the airbag device of FIG. 4 are the same as those of the airbag of FIG. 1b. For assembling the airbag device of FIG. 4, the inflator 16 is previously fitted into the housing portion 18a of the holding plate 18 inside the airbag 20. After that, the holding plate 18 and the airbag 20 are mounted to the container 10', whereby the inflator 16 is mounted to the container 10'.

Though the embodiments mentioned above relate to the airbag device for the passenger's seat, the present invention can be applied to an airbag device for a rear seat.

Though the container is made of the synthetic resin in the aforementioned embodiments, the container may be made of synthetic resin impregnated paper or thin and lightweight metal including aluminum or an alloy thereof.

As mentioned above, according to the present invention, the airbag, the inflator, the holding plate, and the mounting bracket can be connected together. A member made of lightweight material including synthetic resin may be employed as the container for the airbag device. In case where the container is made of synthetic resin, the container can be manufactured easily even when the container has a complex configuration. The reinforcement by a mesh member is not required even when the container is made of synthetic resin.

What is claimed is:

1. An airbag device comprising:

a container having a bottom, an air bag disposed inside the container and having an opening confronting the bottom of the container, a lid for covering the container, an inflator disposed in the container for generating gas to inflate the airbag, a holding plate disposed inside the airbag for mounting the inflator and the airbag to the container, and a mounting bracket disposed under the container and the inflator for supporting the container and a substantial area of the inflator thereon to secure the container and the inflator to a structural member of a vehicle, a peripheral portion of the opening of the airbag and the container being clamped between the holding plate and the mounting bracket.

2. The airbag device as claimed in claim 1, wherein said container is provided with an opening formed in the bottom thereof and wherein said mounting bracket and said inflator are in contact with each other through the opening of said container and the opening of said airbag.

3. The airbag device as claimed in claim 1, wherein the bottom of said container lies between said inflator and said mounting bracket.

4. The airbag device as claimed in claim 1, wherein said holding plate comprises a housing portion covering said inflator and a flange portion projecting from an entire periphery of said housing portion and superposed on a peripheral portion of said opening of said airbag, and the housing portion is provided with gas holes for allowing gas spouted from said inflator to pass therethrough.

5. The airbag device as claimed in claim 4, wherein said flange portion has stud bolts fixed thereto, end portions of said stud bolts protrude through the airbag, the container and the mounting bracket, and nuts are screwed onto the end portions of said stud bolts outside said mounting bracket, whereby the holding plate, the peripheral portion of the opening of the airbag, the inflator, the container, and the mounting bracket are integrated together.

6. The airbag device as claimed in claim 1, wherein said container is made of synthetic resin and said holding plate and said mounting bracket are made of metal.

7. The airbag device as claimed in claim 1, wherein said inflator is substantially entirely disposed inside the airbag and is held between the holding plate and the mounting bracket.

* * * * *